United States Patent [19]
Sato et al.

[11] 3,953,774
[45] Apr. 27, 1976

[54] CONTROL METHOD OF A DC MOTOR
[75] Inventors: Tadasu Sato, Tachikawa; Chuichi Yoshitake, Tokyo, both of Japan
[73] Assignee: Fujitsu Ltd., Japan
[22] Filed: Nov. 30, 1973
[21] Appl. No.: 420,648

[52] U.S. Cl. .............................. 318/594; 318/596; 318/597
[51] Int. Cl.² ........................................ G05B 11/18
[58] Field of Search .......... 318/592, 594, 596, 597, 318/561

[56] References Cited
UNITED STATES PATENTS

| | | | |
|---|---|---|---|
| 2,796,569 | 6/1957 | McDonald et al. | 318/596 X |
| 3,324,364 | 6/1967 | Caruthers | 318/594 X |
| 3,419,775 | 12/1968 | Kardos | 318/596 |
| 3,493,827 | 2/1970 | Tinkler | 318/594 |
| 3,523,227 | 8/1970 | Russell | 318/594 |
| 3,531,800 | 9/1970 | Brescia | 318/594 X |
| 3,611,101 | 10/1971 | Kiffmeyer | 318/594 |
| 3,665,500 | 5/1972 | Lewis et al. | 318/596 |
| 3,670,228 | 6/1972 | Crosby | 318/594 |

OTHER PUBLICATIONS

Arthur et al., *Linear Position Sensing System;* IBM Tech. Bulletin, Vol. 12, No. 1, June 1969.
Padalino et al., *Track Following Servosystem;* IBM Tech. Bulletin, Vol. 11, No. 10, Mar. 1969.

*Primary Examiner*—B. Dobeck
*Attorney, Agent, or Firm*—Nelson E. Kimmelman

[57] ABSTRACT

A control method of a DC motor is described which comprises a digital control method and an analogue control method, wherein a rotor of the DC motor rotates with high speed under the digital control method until the rotating angle of the rotor comes close to a predetermined rotating angle and then the rotor rotates with high accuracy under the analogue control method to the predetermined rotating angle.

5 Claims, 9 Drawing Figures

CONTROL METHOD OF A DC MOTOR

The present invention relates generally to a control method of a DC motor, and more particularly relates to a control method of a DC motor by which an object is moved to a desired position with predetermined high speed and high accuracy. The control method of a DC motor according to the present invention can preferably be applied to such drive systems as a DC motor which is used for high speed printing equipment for the output of a computer. Such printing equipment is usually called a line printer and is an important part of the computer system. The control method according to the present invention may also be utilized for other equipment which requires an automatic servo-control mechanism using a DC motor which is controlled with predetermined high velocity and high accuracy. However, for clarity of explanation, the present invention is hereinafter described with regard to its use only in a line printer.

Recently the demand has arisen for computer line printers which have increased operational speeds, because of increasing computer output speed capability and increased reliability over the prior art line printer because of its importance in the computer system as a machine-to-man interface.

In the line printer, a long belt-shaped paper is fed by a driving motor. The driving motor stops during a time when characters, which are selected by the computer, are printed along a desired line on the paper by printing types which are located movably to and slightly above the paper. When the printing types finish printing the selected characters on said desired line of the paper, the driving motor feeds the paper forward with predetermined high speed according to the program curve which is previously placed on the computer format control tape or according to command pulses from the computer. Then according to the program curve the driving motor suddenly stops and the paper is thereby stopped at a position where the printing position of the printing types is aligned with the next desired line on the paper. Then the printing types start to print the characters which are selected by the computer on the desired line. The line printer in recent years prints characters on 1,500 to 2,000 lines every 1 minute. It should be recognized the driving motor should feed the paper at high speed and then stop the paper at the position where printing position of the printing types is aligned with the desired line on the paper with no error.

In the prior art there are three types of control methods for the driving motor, these are the analogue control method, digital control method and the analogue-digital control method. A preferable embodiment of the analogue-digital control method can be seen, for example, in the British Pat. No. 816,360. Generally the analogue control method is suitable for the driving motor which requires fine locational control, however, it is difficult to drive the driving motor at high speed. This is because the high power which is required to move the driving motor at high speed is not easily and economically obtained for a system using analogue control. The digital control method is suitable for the driving motor which is moved at high speed. This is because the high power which is required to move the driving motor at high speed is easily and economically obtained for a system using digital control by using an extremely high gain power amplifier. However, because the digital controlled power is produced according to pulses the minimum rotational step of the driving motor and, therefore the locational accuracy is limited to the minimum period between the pulses. Consequently, a combination of the digital control method and the analogue control method is most suitable for the driving motor used in the line printer, whereby the desired line on the paper is fed close to the printing position of the printing types at high speed by the digital control and then the printing position is aligned with the desired line with high accuracy by the analogue control.

Usually the driving motor in the line printer comprises a stepping motor. The stepping motor is driven by pulses and has an advantage that it can be operated in an open loop method. However, the stepping motor has a defect in that it produces discontinuous rotation. It is easily recognized that continuous rotation of the driving motor is far more suitable for the line printer because the paper must be smoothly fed by the driving motor at high speed. In addition to the above mentioned defect the stepping motor has the defect that an analogue-digital control method cannot be achieved by the stepping motor. Consequently a DC motor is useful for the driving motor in order to overcome said defects.

Therefore, it is a principal object of the present invention to provide an analogue-digital control method of a DC motor.

It is a further object of the present invention to provide an analogue-digital control method of a DC motor where the DC motor can be driven by only one power amplifier when the DC motor is controlled by the analogue control and by the digital control alternately.

The present invention will be more apparent from the ensuing description with reference to the accompany drawings wherein.

Figure 1:
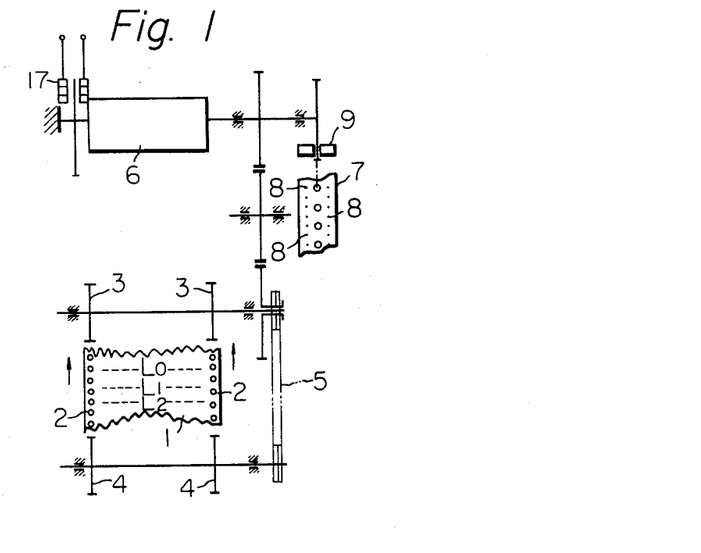
FIG. 1 is a skeleton view showing a mechanism of the line printer according to the present invention.

In FIG. 1, 1 is a long belt-shaped paper on which some characters, selected by a computer, are printed by printing types (not shown) along lines $L_o$, $L_1$, $L_2$ ... $L_n$ ... The paper 1 has holes 2 on both sides thereof and the holes are arranged with the same pitch along one direction perpendicular to the lines $L_1$, $L_2$ ... Further the paper 1 engages with driving gears 3 and 4 by means of the holes 2 and the driving gears 3 and 4 rotate at the same time by means of a timing belt 5. The gears 3 and 4 are driven by a DC motor 6 through other gears. When the DC motor 6 is energized by a power amplifier (not shown), the paper 1 moves in the direction shown by arrows in FIG. 1. Reference numeral 7 indicates the format control tape. The format control tape 7 is previously provided with signals 8. The signals 8 decide which line has to be stopped at the printing position of the printing types. The signals 8 are detected by a detector 9 and the detected signals are provided to an input of a logic control circuit (not shown). The logic control circuit controls the DC motor 6 by comparing the detected signals and said signal 8. Thus the DC motor 6 stops the paper 1 at the exact position where a desired line is aligned with the printing position of the printing types. Naturally, the signals 8 can also be provided from the computer without using the format control tape 7.

Figure 2:
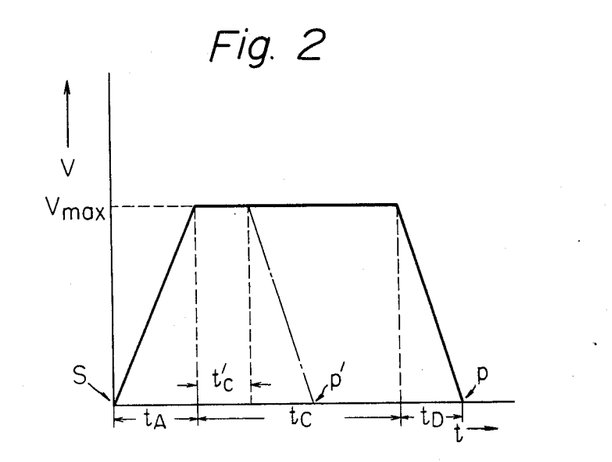
FIG. 2 is a diagram showing the program curve.

Usually the paper 1 is forwarded by the driving motor according to a velocity curve, that is a program curve, as shown in FIG. 2. FIG. 2 shows the relationship between a paper feeding speed V and a time t. Naturally the relationship corresponds to a rotating speed of the rotor of the DC motor. In FIG. 2, the paper starts to move from a position S which corresponds to a first desired line on which selected characters have been printed. The speed of the paper is accelerated by the motor during an interval $t_A$, in FIG. 2, and reaches a predetermined maximum speed $V_{max}$. Then the paper 1 moves during a time $t_C$ at the constant speed $V_{max}$. When the paper 1 comes close to a position P, in FIG. 2, which corresponds to a second desired line on which selected characters are going to be printed, the paper 1 is decelerated during a time $t_D$ in FIG. 2. Thus a desired line is moved to the printing position of the printing types at high speed. If the distance between a first desired line and a second desired line is short, the position P moves to a position P' in FIG. 2, and consequently the time duration in which the paper 1 moves at constant speed $V_{max}$, will be shortened to $t'_C$ in FIG. 2.

Figure 3A:
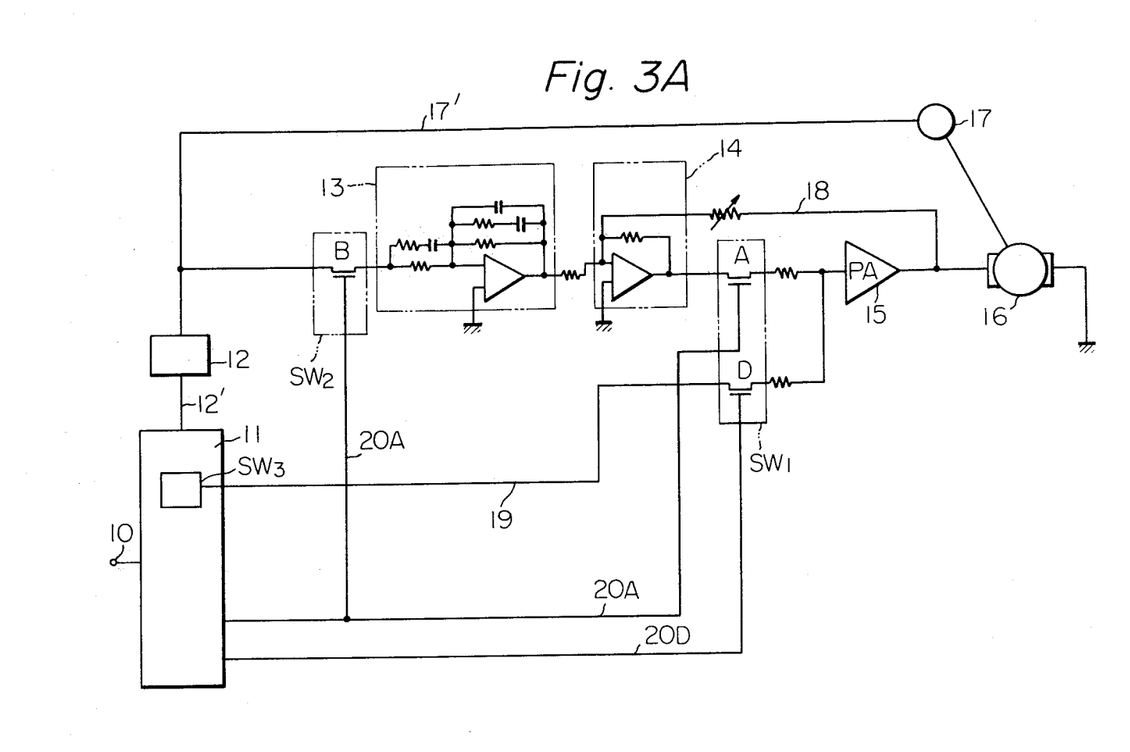
FIG. 3A is a block diagram explaining the analogue-digital control method of a DC motor according to the present invention.

In the present invention the driving motor, that is a DC motor, is driven by a power amplifier and the power amplifier is controlled by a digital controlled signal so that the paper feeding speed V according to the velocity curve shown in FIG. 2 can be achieved very quickly. When the desired line comes near the printing position of the printing types the DC motor is controlled by the analogue controlled signal and the desired line is adjusted into alignment with the printing position of the printing types with high accuracy. FIG. 3A is a block diagram showing the analogue-digital control circuit according to the present invention. In FIG. 3A a command pulse which commands the start of the paper movement, is applied to a first input 10 of a logic control circuit 11. At first the logic control circuit 11 provides signals to switches $SW_1$ and $SW_2$ through control lines 20A and 20D, respectively. At this time a field effect transistor (FET) A in $SW_1$ and a field effect transistor (FET) B in $SW_2$ become non-conductive and a field effect transistor (FET) D becomes conductive. The $SW_1$ switches two modes alternately, these are an analogue control mode and a digital control mode. Consequently, FET A and FET D do not become conductive (or non-conductive) at the same time. At first FET D, as mentioned above, is conductive, and then positive control pulses are applied to a power amplifier 15 from the logic control circuit 11 through a feed line 19 and a switch $SW_3$. The power amplifier 15 provides a digital controlled high power to a DC motor 16 which corresponds to the DC motor 6 in FIG. 1. Then the rotor of the DC motor 16 starts to rotate. A position sensor 17 which is fixed to a shaft of the rotor starts to provide position signals to a wave form circuit 12 through signal line 17'. The wave form circuit 12 rebuilds the position signals from the position sensor 17 into a wave form suitable for the logic control circuit 11 to deal with. The rebuilt position signals from the wave form circuit 12 are provided to the logic control circuit 11 through signal line 12'. The rotating speed of the rotor of the DC motor 16, as well as the paper feeding speed, is detected by the logic control circuit 11. The logic control circuit 11 provides the positive control pulses through the switch $SW_3$ to the power amplifier 15, which is an extremely high gain power amplifier, until the paper feeding speed V in FIG. 2 reaches the predetermined speed $V_{max}$ in FIG. 2. The positive control pulses are applied to the power amplifier 15 and make a transistor $T_{R1}$ in FIG. 3B of the power amplifier 15 conductive. Then an extremely high positive power from the power amplifier 15 is applied to the DC motor 16 whereby the paper feeding speed is accelerated during the time $t_A$ in FIG. 2. During the $t_C$ in FIG. 2 the logical control circuit 11 provides small pulses to keep the paper feeding speed constant at $V_{max}$. When the count of the position signals reaches a predetermined count which is provided, for example, from said format control tape, a command pulse which commands deceleration of the paper movement is applied to the first input 10 of the logic control circuit 11. At this time negative control pulses through the switch $SW_3$ from the logic control circuit 11 are applied to the power amplifier 15. The negative control pulses make a transistor $T_{r2}$ in FIG. 3B conductive. Then extremely high negative power is applied to the DC motor 16 and the DC motor 16 is braked, whereby the paper feeding speed is decelerated suddenly during the time $t_D$ in FIG. 2. During the time $t_D$, a desired line approaches close to the printing position of the printing types.

It is difficult to bring the paper to a position where the printing position of the printing types is exactly aligned with the desired line by using the digital controlled power. This is because the digital control, as mentioned above, is not suitable for fine locational control. Therefore, when the desired line comes close to the printing position of the printing types, that is when in FIG. 2 the paper feeding speed V changes at the very end of the time $t_D$, the logic control circuit 11 makes the FET D non-conductive and makes the FET A and B conductive at a time when a command pulse "stop" is applied to the input 10. This changes the control mode from the digital to the analogue control mode. When the FET A becomes conductive, a negative feedback path is provided to the power amplifer 15 through a line 18 and a buffer amplifier 14 which buffers a signal impedance. Consequently, the power amplifier 15 acts as a linear power amplifier which can follow any slight changes of the analogue signal. The position sensor produces a position signal which is very low frequency when the paper feeding speed V comes near the point P in FIG. 2. When the rotor of the DC motor 16 rotates with high speed, the position signals from the position sensor form voltage pulses and are provided as digital signals. On the other hand when the rotor of the DC motor 16 rotates with very low speed, said position signal is provided as an analogue signal. When a desired line approaches close to the printing position of the printing types said analogue signal is applied to the power amplifier 15 through the FET B, a compensating network 13, the buffer amplifier 14, the FET A and also the feedback line 18. The compensating network 13 is inserted to obtain the stability in an analogue control system. The power amplifier 15 stops producing power when the level of the analogue signal from the position sensor 17 coincides with the zero potential level, where the rotation of the rotor of the DC motor 16 stops. If the desired line is located in front of the printing position of the printing types the level of the analogue signal is over the zero potential level, in other words the analogue signal is positive, and the DC motor 15 moves the paper forward until the desired line is aligned with the printing position of the printing types. If the desired line is located beyond the printing position of the printing types the level of the analogue signal is under the zero potential level, in other words the analogue signal is negative, the rotation of the rotor of the DC motor is reversed and the desired line is returned to the printing position of the printing types.

Figure 4A:
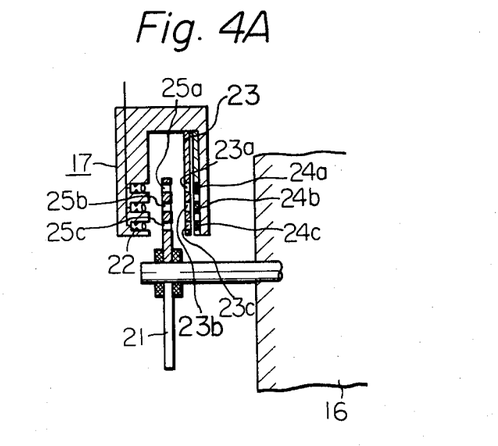
FIG. 4A is a partial section view of the position sensor 17 shown in FIG. 3A.

The action of the analogue-digital control of the DC motor will be understood from the following explanation with reference to FIGS. 4A, 4B, 4C, 5 and 6. FIG. 4A shows a partial section view of the position sensor 17 which produces the position signals indicating the position where the line on the paper is actually located. The position sensor comprises: a circular disk 21 which is fixed to the end of the shaft of the rotor of the DC motor 16 and is provided with three kinds of through holes 25a, 25b and 25c; a plate 23 which is provided with three kinds of slits 23a, 23b, 23c; three lamps 22, and; three kinds of photocells 24a, 24b and 24c. Thus each light beam from the lamp 22 is projected to the photocells 24a, 24b and 24c through the holes and slits 25a and 23a, 25b and 23b, and 25c and 23c, respectively.

Figure 4B:
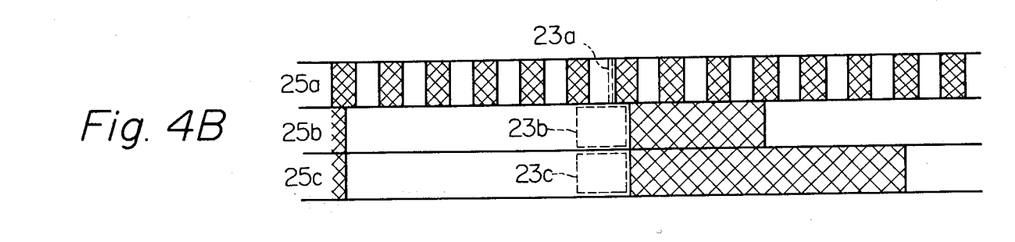
FIG. 4B is a detailed plan view of the position sensor.

FIG. 4B shows the arrangement of the three kinds of through holes 25a, 25b and 25c. In FIG. 4B, it should be noted that the through holes 25a, 25b and 25c are actually arranged along three respective circles on the circular disk 21. Double hatched portions in FIG. 4B signify non-transparent parts. Three slits 23a, 23b and 23c are arranged in a manner as shown in FIG. 4B by dotted lines. Each light beam from the lamp 22 is projected to the phtocells 24a, 24b and 24c only when the double hatched portions, that is non-transparent parts, do not overlap the slits 23a, 23b and 23c along the direction of the light beam. As shown in FIG. 4B, the slits 25a are arranged with the same small pitch, the slits 25b are arranged with same pitch which is far larger than that of the slits 25a and the slits 25c are arranged with same pitch which is larger than that of the slits 25b. The position signals produced by using the slits 25b and also 25c designate a pitch with which the lines $L_0, L_1, L_2 \ldots$ shown in FIG. 1 are arranged. The position signals from the slits 25b designate a first pitch by which eight lines are included in every 1 inch. The position signals from the slits 25c designate a second pitch by which six lines are included in every 1 inch. In the line printer a pitch by which the lines $L_0, L_1, L_2 \ldots$ are arranged on the paper is usually regulated into said first pitch and said second pitch.

Figure 4C:
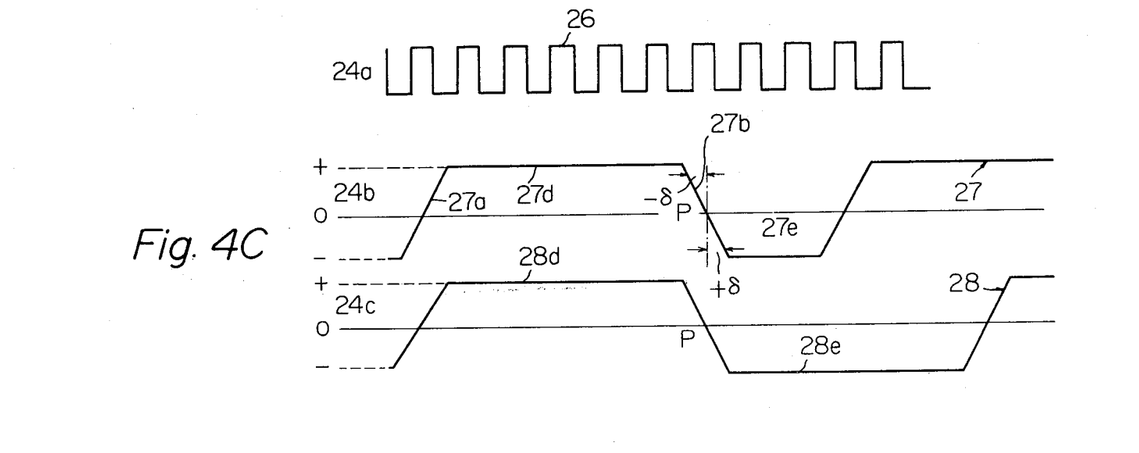
FIG. 4C is a timing chart of output signals from the position sensor.

FIG. 4C shows a timing chart of the position signals produced from the photocells 24a, 24b and 24c. During a time when the rotor of the DC motor 16 rotates, the position signal from the photocell 24a becomes a high frequency rectangular wave form 27 in FIG. 4C, and the position signals from the photocells 24b and 24c become low frequency trapezoid wave forms 27 and 28, respectively, in FIG. 4C. Naturally when the rotor of the DC motor 16 rotates at high and low rotating speed the frequencies of the wave forms 26, 27 and 28 also become high and low, respectively. Slopes 27a or 27b of the trapezoid wave form 27 in FIG. 4C are obtained when one end of the double hatched portion in FIG. 4B goes across the slit 23b. The light beam through the slit 23b is gradually shielded by one double hatched portion in accordance with the change of the rotating speed of the disk 21. The slope cannot be seen in the rectangular wave form 26 because the width of the slit 23a is too short to cause the slope. The rectangular wave forms 26 act as scale pulses. When the number of the trapezoid waves 27 reaches a number which is memorized in, for example, said format control tape 7, and when the slope 27a of the trapezoid wave form 27 is produced, a command pulse which commands deceleration of the paper is applied to the first input 10. When a predetermined number of scale pulses has passed, counted from an appearance of the slope 27a, the slope 27b from the photocell 24b occurs. In FIG. 4C a point P indicates a position where the rotation of the DC motor 16, as well as the paper, should stop. The point P is a cross point of the zero potential level and the potential level of the slope 27b. Consequently, the slope 27b corresponds to the abovementioned analogue signal. This analogue signal is applied to the power amplifier 15 through the FET B, the compensating network 13, the buffer amplifier 14 and the FET A (see FIG. 3A). In FIG. 4C the analogue signal, that is the slope 27b, is used to control a fine range $2\delta$. If the desired line on the paper is located in front of the printing position of the printing types, a positive analogue signal in the range $-\delta$ moves the paper forward slightly. If the desired line on the paper is located beyond the printing position of the printing types, a negative analogue signal in the range $+\delta$ moves the paper backward.

Figure 3B:
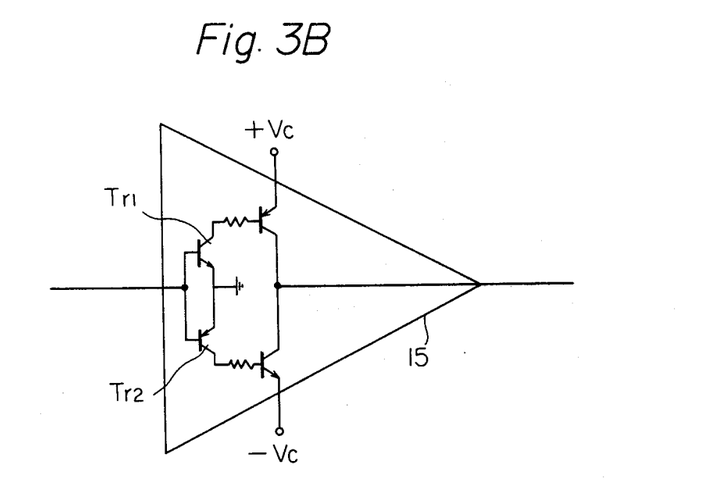
FIG. 3B is a detailed cirucit diagram of the power amplifier 15 shown in FIG. 3A according to the present invention.
Figure 5:
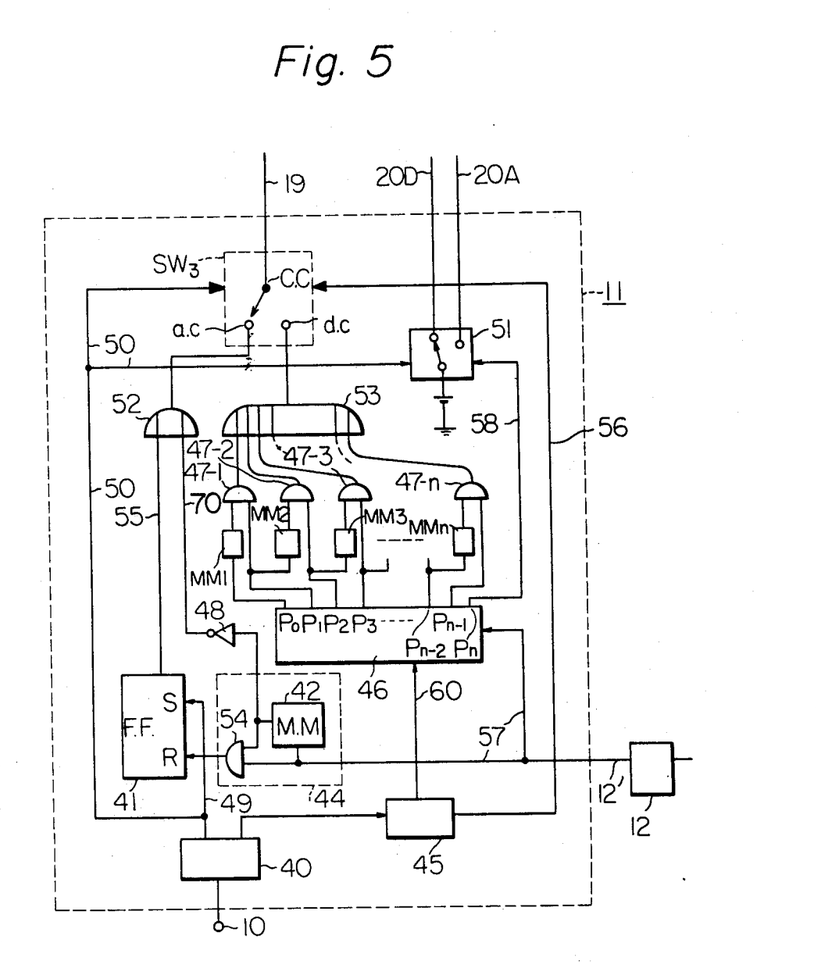
FIG. 5 is a detailed block diagram of the logic control circuit 11 shown in FIG. 3A.
Figure 6:
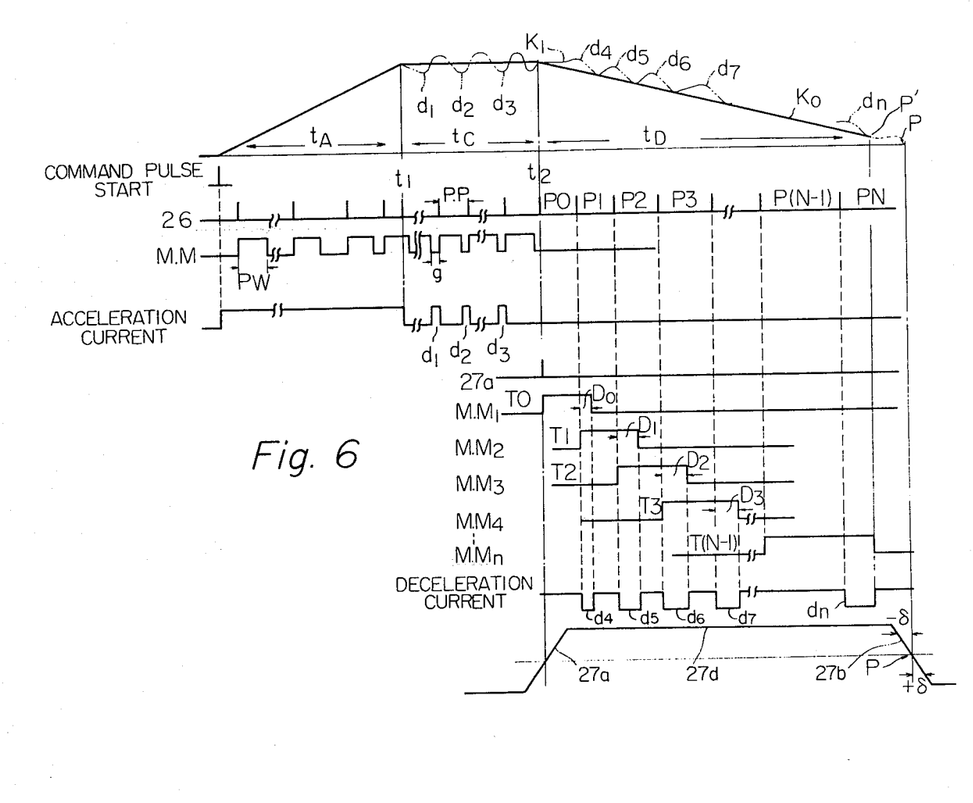
FIG. 6 is a timing chart explaining the analogue-digital control method of a DC motor according to the present invention.

FIG. 5 shows a detailed block diagram of the logical control circuit 11. A command pulse which commands the start of the movement of the paper is applied to the first input 10 and is further applied to an acceleration-deceleration switching circuit 40. The output signal from the switching circuit 40 connects the common contact cc of the switch $SW_3$ to an acceleration contact ac through a line 50. At the same time the output signal from the switching circuit 40 is also applied through a line 49 to the acceleration circuit 41 which comprises the flip-flop circuit FF. At this time the flip-flop FF produces an acceleration signal and the acceleration signal is applied to the feed line 19 through an or-circuit 52 and $SW_3$. At the same time the switch 51 is controlled by said output signal from the switching circuit 40. Then the FET D is made conductive by a signal provided from the switch 51 through the feed line 20D. At this time the acceleration signal is applied to the power amplifier 15 through the feed line 19. As a result, the rotor of the DC motor 16 starts to rotate and accelerates very quickly. The position signal is also produced by the position sensor 17 together with the rotation of the rotor of the DC motor 16. The scale pulses 26 are applied to a first input of an and-circuit 54 in an acceleration time control circuit 44 through a line 57. On the other hand output signals from a monostable multivibrator (MM) 42, which is triggered by the scale pulses through the line 57, are applied to a second input of the and-circuit 54. The pulse width, that is PW in FIG. 6, of the output signal from the MM 42 is previously determined so as to be equal to the minimum pulse period of the scale pulse 26 which is provided when the circular disk 21 rotates with predetermined maximum rotating speed, in other words the maximum paper feeding speed $V_{max}$ in FIG. 2. One of the pulse periods of the scale pulses is shown in FIG. 6 by reference symbol PP. The DC motor 16 is energized during a time when the pulse period PP is longer than the pulse width pw. The comparison of the pulse period PP and the pulse width PW is done by the and-circuit 54 in the acceleration control circuit 44. When the pulse period PP becomes equal to or smaller than the pulse width PW, in other words when the maximum paper feeding speed $V_{max}$ in FIG. 2 is obtained, the output signals which are applied to the first and second input of the and-circuit 54 become high level at the same time. This timing corresponds to a time $t_1$ in FIG. 6. Then an output signal from the and-circuit 54 resets the flip-flop FF. The rotor of the DC motor then rotates with a predetermined maximum rotating speed and the paper runs at the maximum paper feeding speed $V_{max}$. The above-mentioned process will be more clear by referring to the timing chart shown in FIG. 6. In FIG. 6, the diagram drafted on the top corresponds to the diagram shown in FIG. 2. The numeral 26 signifies a timing chart of the scale pulse 26, however, in FIG. 6 only the building-up portion of each scale pulse 26 is indicated. The symbol MM signifies a timing chart of the output signal from the monostable multivibrator (MM) 42, the pulse width of which is PW. The acceleration current starts to flow when a command pulse "start" is applied to the first input 10. The acceleration current is not imparted to the DC motor 16 when PP becomes equal to PW at said time $t_1$. During the time $t_c$ in FIG. 6, the paper runs at the predetermined paper feeding speed $V_{max}$. However, the paper feeding speed $V_{max}$ is reduced by mechanical friction. When the paper feeding speed is reduced the pulse period PP becomes larger than PW at a time $d_1$ in FIG. 6, and a gap between the pulses of MM, such as shown by g in FIG. 6, is changed to a positive pulse by means of an inverter-circuit 48. This positive pulse is applied to the feed line 19 through a line 70, the or-circuit 52 and the switch SW$_3$ and the small acceleration current $d_1$ which keeps the paper feeding speed at $V_{max}$ again is applied to the DC motor 16. In FIG. 6 the above mentioned case occurs at times $d_2$, $d_3$, . . .. When the command pulse "stop" is applied to the first input 10 at a time $t_2$ according to, for example, the format control tape, and when the slope 27a of the trapezoid wave 27 in FIG. 4C is produced, a deceleration current is applied to the DC motor 16 in the manner as mentioned hereinafter. In FIG. 5, the command pulse "stop" is applied to the first input 10 and is further applied to the acceleration-deceleration switching circuit 40. The switching circuit 40 energizes a deceleration control circuit 45 and the deceleration control circuit 45 connects the common contact cc of the switch SW$_3$ to a deceleration contact dc through a line 56 when the slope 27a of the trapezoid wave 27 is produced and also energizes a counter 46 through a line 60. The trapezoid wave 27 is produced with the same timing as the lines on the paper are moved forward every one line. When the slope 27a is produced the counter 46 starts to count the number of the scale pulses 26 through a line 57. As each scale pulses 26 is received by the counter 46 the counter 46 trigger a monostable multivibrator so that monostable multivibrators MM$_1$, MM$_2$, MM$_3$, . . . MM$_n$ are triggered one after another. This can be seen in FIG. 6, wherein the monostable multivibrators MM$_1$, MM$_2$, MM$_3$, . . MM$_n$ are triggered at the same pace by which the scale pulses 26 are produced. Further, pulse width $T_1$ of the output signal from Mm$_2$ is previously determined to be larger than the pulse width $T_0$ of the output signal from Mm$_1$ and the pulse width $T_2$ of the output signal from MM$_3$ is previously determined to be larger than the pulse width $T_1$. Relationships $T_3 > T_2$, $T_4 > T_3$, . . ., $T_N > T_{N-1}$ are similarly obtained. In addition, the pulse width $T_0$, $T_1$, $T_2$, . . . $T_N$ are previously selected to be equal to the pulse pitches $P_o'$, $P_1'$, $P_2'$, . . . $P_N'$ of the scale pulses 26, which will be produced when the rotor of the DC motor 16 rotates according to the program curve $K_0$ (shown on the top of FIG. 6) of the paper feeding speed during the deceleration time $T_D$. The paper feeding speed is actually higher than the program curve $K_0$, as shown by a chain dotted line $K_1$ on the top of FIG. 6. Consequently, the pulse periods $P_0$, $P_1$, $P_2$, . . . $P_N$ of the scale pulses 26 are smaller than the pulse widths $T_0$, $T_1$, $T_2$, . . . $T_N$ which are, as mentioned above, equal to the pulse pitches $P_o'$, $P_1'$, $P_2P_N'$. As can be seen in FIG. 6 the pulse width $T_0$ is larger than the pulse period $P_0$ by a interval $D_0$ at a time $d_4$. This interval $D_0$ is produced by means of the monostable multivibrator MM$_1$, the output signal from $P_1$ of the counter 46 and an and-circuit 47-1 in FIG. 5. Then a deceleration signal which is proportional to the interval $D_0$ is applied to the power amplifier 15 through an or-circuit 53, contact dc of the switch SW$_3$ and the feed line 19. At this time the deceleration current is applied to the DC motor 16 during a duration of time which is equal to the pulse interval $D_0$. Then the paper is braked and the actual paper feeding speed $K_1$ equals the program curve $K_0$ in FIG. 6. When the deceleration current is not applied to the DC motor 16, the paper feeding speed $K_1$ becomes higher than the program curve $K_0$ at a time $d_5$ and the pulse period $P_1$ becomes smaller than the pulse width $T_1$ by a pulse interval $D_1$. This interval $D_1$ is produced, as mentioned above, by means of the monostable multivibrator MM$_2$, the output signal from $P_2$ of the counter 46 and an and-circuit 47-2 in FIG. 5. Then a deceleration signal which is proportional to the interval $D_1$ is applied to the power amplifier 15 through an or-circuit 53, contact dc of the switch SW$_3$ and the feed line 19. At this time the deceleration current is applied to the DC motor 16 during the time $D_5$. Then the paper is braked and the actual paper feeding speed $K_1$ equals the program curve $K_0$ again. Thus the paper moves according to the program curve $K_0$ to the position P' where the desired line on the paper is located very near the printing position of the printing types. Because the program curve $K_0$ is previously set up so that n pieces of the scale pulses are included in a time from 27a to 27b of the trapezoid wave form 27 in FIG. 4C, when the monostable multivibrator MM$_n$ has finished producing a pulse $T_{(N-1)}$ at the end of a time $d_n$ the photocell 23b produces slope 27b of the trapezoid wave form 27 in FIG. 4C. In FIG. 5 when MM$_n$ has finished producing a pulse $T_{(N-1)}$ and when the next scale pulse is applied to the counter 46, the counter 46 produces an output signal to a line 58. The output signal through the line 58 switches the contact in the switch 51. Then the FET A and also the FET B in FIG. 3B are made conductive by a signal through a feed line 20A in FIGS. 3A and 5. The FET D is now non-conductive. The rotating speed of the disk 21 is very slow because the paper now moves with the paper feeding speed shown by the point P' on the top of FIG. 6. Consequently, the position sensor 17 cannot produce the scale pulses 26 any longer at such a low rotating speed of the disk 42. Therefore, only the slope 27b of the trapezoid wave form 27 is applied to the power amplifier 15 as an analogue control signal through the FET B, the compensating circuit 13, the buffer amplifer 14 and the FET A. In addition, the feedback loop can also be achieved through the line 18, the buffer amplifier 14 and the FET A. In the slope 27b shown on the bottom of FIG. 6 the point P indicates the position where the desired dline is aligned with the printing position of the printing types. If the desired line on the paper is located in front of the printing position of the printing types, in other words if the slope 27a of the analogue signal 27 produces a positive analogue signal in the range $-\delta$, a positive voltage is applied to the DC motor 16 from the power amplifier 15 until the level of the slope 27b becomes zero. If the desired line on the paper is located beyond the printing position of the printing types, in other words if the slope 27b of the analogue signal 27 produces a negative analogue signal in the range $+\delta$, a negative voltage is applied to the DC motor 16 from the power amplifier 15 until the level of the slope 27b becomes zero. Thus the desired line reaches alignment with the printing position of the printing types with high accuracy. In FIG. 3A the FET B is inserted to prevent capacitors being charged during time $t_A$, $t_C$ and $t_D$ shown on the top of FIG. 6. If the capacitors are charged during the times $t_A$, $t_C$ and $t_D$ the potential level of the analogue signal, that is the slope 27b, slides upward or downward according to the potential levels of said capacitors. Accordingly, a highly accurate control cannot be achieved.

As mentioned above the DC motor in the line printer is controlled at high speed by using an extremely high gain power amplifier under the digital control and is controlled with high accuracy by using the linear power amplifier under the analogue control. In addition said extremely high gain power amplifier and linear power amplifier can be obtained by using only one power amplifier.

What is claimed is:

1. A control method of a DC motor or the like including:

providing an analogue signal and a scale pulse both of whose periods change in proportion to the rotating speed of a rotor of said motor, wherein the amplitude of the analogue signal is proportional to a deviation between a destination position at which an object to be moved by said motor during every predetermined feeding interval is to be stopped and a position where the object is actually located, and the amplitude of the analogue signal has one polarity when the object is located in front of the destination position and another polarity when the object is located beyond the destination position, while a predetermined number of the scale pulses are included within said predetermined feeding interval;

providing a program curve which contains said intervals with which said object is supplied close to the destination position, and also contains time intervals and as a result of the comparison of the period of the scale pulse and said time intervals the object is moved to the desired position at a predetermined acceleration rate, running speed and deceleration rate;

moving said object by means of said motor which is driven by a power amplifier under control of pulse-width modulated pulses until said object comes close to the destination position, wherein the pulse-width modulated pulses are produced according to the deviation which is detected by comparing said time interval and the period of said scale pulse, and;

moving the object by means of said motor which is driven by said power amplifier under control of said analogue signal when the object comes closer to the destination position, wherein said power amplifier includes a negative feed-back loop so that the power amplifier may act as a linear power amplifier.

2. An apparatus for controlling a DC motor comprising:

a power amplifier driving the DC motor to be controlled;

a position sensor providing an analogue signal and a scale pulse the periods of both of which change in proportion to the rotating speed of a rotor of the DC motor, wherein the amplitude of the analogue signal is proportional to a deviation between a destination position at which an object being moved in every predetermined interval is to be stopped and a position where the object is actually located, and the amplitude of the analogue signal has one polarity when object is located in front of the destination position and another polarity when the object is located beyond the destination position, while a predetermined number of the scale pulses are included within said predetermined interval;

a control pulse providing means according to a program curve which contains said intervals by which the object is moved close to the destination position, and also contains the time intervals and as a result of the comparison of the period of the scale pulse and said time intervals the object is moved to the destination position at a predetermined acceleration rate, running speed and deceleration rate;

a control means which controls said power amplifier under control of the pulse-width modulated pulses until the object comes close to the desired position, wherein the pulse-width modulated pulses are produced according to the deviation which is detected by comparing said time interval and the period of said scale pulse;

a first switch applying the pulse-width modulated pulses to the power amplifier, which is conductive until the object comes close to the destination position;

a second switch which is conductive when the first switch is non-conductive applying said analogue signal to the power amplifier when the object is located closer to the destination position.

3. An apparatus for controlling a DC motor as set forth in claim 2, wherein said power amplifier forms a negative feedback loop when said second switch is conductive and an output signal from the power amplifier and said analogue signal are applied to the input of the power amplifier through a buffer amplifier and the second switch.

4. An apparatus for controlling a DC motor as set forth in claim 2, wherein said time interval which is contained in said program curve is produced by a monostable multivibrator.

5. An apparatus for controlling the DC motor as set forth in claim 2, wherein said pulse-width modulated pulse is produced by the deviation which is detected by an and-circuit, where the period of scale pulse is applied to a first input of the and-circuit and said time interval which is produced by a monostable multivibrator triggered by the scale pulse is applied to a second input of the and-circuit.

* * * * *

UNITED STATES PATENT OFFICE
CERTIFICATE OF CORRECTION

PATENT NO. : 3,953,774
DATED : April 27, 1976
INVENTOR(S) : Tadasu Sato et al

It is certified that error appears in the above–identified patent and that said Letters Patent are hereby corrected as shown below:

On the cover sheet item [30] should read as shown.

| Japan | 47-121225 | December 5, 1972 |
| Japan | 47-123451 | December 11, 1972 |

Signed and Sealed this

Third Day of August 1976

[SEAL]

Attest:

RUTH C. MASON
*Attesting Officer*

C. MARSHALL DANN
*Commissioner of Patents and Trademarks*